(12) United States Patent
Boggs et al.

(10) Patent No.: US 6,444,487 B1
(45) Date of Patent: Sep. 3, 2002

(54) FLEXIBLE SILICON STRAIN GAGE

(75) Inventors: Bradley J. Boggs, Mentor; Marcus S. Just, Parma; Kevin C. Stark, Richmond Heights; Christopher A. Bang, North Royalton, all of OH (US)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

(21) Appl. No.: 09/245,272

(22) Filed: Feb. 5, 1999

Related U.S. Application Data

(60) Provisional application No. 60/105,250, filed on Oct. 22, 1998, and provisional application No. 60/094,358, filed on Jul. 28, 1998.

(51) Int. Cl.[7] .............................................. H01L 21/00
(52) U.S. Cl. ............................ 438/48; 438/50; 438/459
(58) Field of Search ................................ 438/48–50, 51, 438/52, 53, 977, 11, 18, 5, 6, 455, 459, 464; 29/618; 257/417; 73/719, 720, 721, 777, 862.65; 338/2, 3, 4, 5, 6

(56) References Cited

U.S. PATENT DOCUMENTS

| 3,798,754 | A | | 3/1974 | Price et al. |
| 4,422,063 | A | | 12/1983 | Pryor ............................ 338/2 |
| 4,526,043 | A | | 7/1985 | Boie et al. |
| 4,658,233 | A | | 4/1987 | Uchida et al. ................. 338/5 |
| 4,745,812 | A | | 5/1988 | Amazeen et al. |
| 4,777,826 | A | | 10/1988 | Rud, Jr. et al. |
| 4,839,512 | A | | 6/1989 | Speck |
| 5,108,819 | A | * | 4/1992 | Heller et al. ................. 428/195 |
| 5,184,516 | A | | 2/1993 | Blazic et al. |
| 5,192,938 | A | | 3/1993 | Ort |
| 5,244,817 | A | * | 9/1993 | Hawion et al. .............. 438/459 |
| 5,328,551 | A | * | 7/1994 | Kovacicit ..................... 156/630 |
| 5,332,469 | A | * | 7/1994 | Mastrangelo ................ 156/663 |
| 5,413,111 | A | | 5/1995 | Wilkinson |
| 5,429,006 | A | | 7/1995 | Tamori |
| 5,446,437 | A | * | 8/1995 | Bantien et al. ................ 338/28 |
| 5,503,029 | A | | 4/1996 | Tamori |
| 5,503,030 | A | | 4/1996 | Bankeström |
| 5,518,674 | A | * | 5/1996 | Powell et al. ................ 868/104 |
| 5,524,034 | A | | 6/1996 | Srygley et al. |
| 5,533,515 | A | | 7/1996 | Coller et al. |
| 5,571,973 | A | | 11/1996 | Taylot |
| 5,604,314 | A | | 2/1997 | Grahn |
| 5,610,747 | A | | 3/1997 | Jacobsen |
| 5,631,198 | A | * | 5/1997 | Hartauer ...................... 438/53 |
| 5,639,693 | A | * | 6/1997 | Koseki et al. ................. 438/50 |
| 5,742,222 | A | | 4/1998 | Young et al. ................ 438/149 |
| 5,776,803 | A | * | 7/1998 | Young ......................... 438/149 |
| 5,827,756 | A | * | 10/1998 | Sugiaro et al. ................ 438/50 |
| 6,004,494 | A | * | 12/1999 | Debe ........................... 264/106 |

OTHER PUBLICATIONS

Institute of Physics Publishing, *Thin Film Resistive Sensors*, 1992.

(List continued on next page.)

*Primary Examiner*—Savotri Mulpuri
(74) *Attorney, Agent, or Firm*—Thompson Hine LLP

(57) ABSTRACT

A generally flexible strain gage comprising a strain sensing element, and a generally flexible substrate supporting the strain sensing element. The strain sensing element is made of single crystal or polycrystalline semiconducting material. The invention also includes a method for forming a generally flexible strain gage comprising the step of selecting a wafer having a portion of a base material and portion of a single crystal or polycrystalline semiconducting material located thereon. The method further comprises the steps of etching a strain sensing element out of the semiconducting material and forming a generally flexible substrate onto said sensing element.

31 Claims, 6 Drawing Sheets-

OTHER PUBLICATIONS

BLH Electronics, Inc., *Semiconductor Gags—Gage Application*, 1985.

BHL Electronics, Inc., *Semiconductor Strain Gages*, May 1985.

Micron Instruments, Inc., *Semi–Conductor Strain Gages*, 1997.

Hetke, J.F. et al., "Flexible Silicon Interconnects for Microelectromechanical Systems", IEEE, 1991.

Barth, P.W., "Micromachining Technology for Flexible Sensor Arrays", Micromachining and Micropackaging of Transducers, pp. 189–197 (1985).

Kaneko, S. et al., "Monolithic Fabrication of Flexible Film and Thinned Integrated Circuits", Proceedings IEEE 10th Annual Workshop on MEMS, 1997.

Jiang, F. et al., "A Surface–Micromachined Shear Stress Imager", Proceedings IEEE, 9th Annual International Workshop on MEMS 1996, San Diego, California.

Jiang, F. et al., "A Flexible MEMS Technology and its First Application to Shear Stress Sensor Skin", Proceedings IEEE, 10th Annual International Workshop on MEMS, Jan. 26–30, 1997, Nagoya, Japan.

Mehregany, M. et al., "MEMS for Smart Structures", Proceedings of SPIE Conference on Smart Structures and Materials, San Diego, CA, Feb. 26–Mar. 3, 1995.

Kuline Sensors Limited brochure entitled "Eureka Innovative Engineering Design. Sensing technology: Buried gas flow transducers withstand 32,000g"; Date unknown; applicant admits prior art status for the limited purpose of examination and reserves the right to challenge the status of this publication as prior art.

Weiler, W., "Handbuch der Physikalisch–Technischen Kraftmessung," Verlag, Braunschweig, p. 75 (1993).

Written Opinion mailed Sep. 9, 2000, regarding corresponding International Application No. PCT/US99/16900.

Douglas, Richard D., Ed., *Semiconductor and Conventional Strain Gages*, Sanchez, J.C. and Wright, W.V., "Recent Developments in Flexible Silicon Strain Gages," 1962, pp. 307–345.

* cited by examiner

FLEXIBLE SILICON STRAIN GAGE

The present application claims priority to U.S. Provisional Application No. 60/094,358 filed Jul. 28, 1998 and to U.S. Provisional Application No. 60/105,250 filed Oct. 22, 1998.

This invention was made with U.S. Government support under Contract No. N66001-97-C-8614; Contract No. DAAL 01-97-C-0054; and Contract No. DAAL 01-98-C-0036. The U.S. Government has certain rights in the invention.

FIELD OF THE INVENTION

The present invention is directed to the strain gage arts. It finds particular application to a generally flexible strain gage having a semiconducting stain sensing element and will be described with particular reference thereto.

BACKGROUND OF THE INVENTION

Strain gages are often used to sense strain in a subject material. The strain gage has a strain sensing element that is attached or adhered to the subject material. When the subject material is strained, the resistance of the sensing element changes in proportion to the strain it experiences. The change in resistance in the sensing element as it is compressed or elongated is measured and used to calculate strain in the subject material. Foil strain gages, which have a metal sensing element, are often used to measure strain. However, metal sensing elements have a relatively low gage factor, which reduces the sensitivity of the gage. The use of a semiconductor material, such as doped single crystal silicon or polycrystalline silicon, as the sensing element increases the gage factor of the strain gage dramatically. However, because most semiconductor materials are generally fragile, a semiconducting sensing element is prone to fracture. In order to protect the semiconducting strain sensing element, it is typically mounted upon a rigid backing to provide support (termed a "backed" gage). This rigid backing prohibits use of the gage on curved surfaces. Alternately, an unbacked gage may be used wherein the sensing element is directly adhered to the material. However, unbacked gages are difficult to mount, and the sensing element is exposed and thus still prone to fracture. The unbacked gages are too fragile to mount on curved surfaces. Accordingly, there is a need for a strain gage having a semiconducting strain sensing element, wherein the strain gage has a generally flexible substrate and/or sensing element to provide ease of handling and enable the gage to be used on curved or irregular surfaces.

Many difficulties arise when trying to form a single crystal semiconducting material or polycrystalline material on a flexible substrate, such as polyimide. It is known that amorphous silicon may be adhered to a flexible substrate using glow-discharge decomposition, but this process can not be used with other forms of silicon. Instead, single crystal or polycrystalline silicon must be deposited or grown by different methods, such as epitaxial growth. However, epitaxial growth requires temperatures of around 950° C., and a polyimide substrate decomposes around 550–580° C. Polycrystalline silicon deposition also occurs at temperatures above 500° C. Thus, epitaxial growth is not feasible for use with polyimide substrates. Furthermore, epitaxial growth can only deposit silicon on an already-existing layer of single crystal silicon, and therefore this process cannot be used to deposit single crystal or polycrystalline silicon on a flexible substrate.

The present invention is also directed to a method of manufacturing a sensor, and more particularly, to a method of manufacturing a generally flexible strain gage. When manufacturing a backed sensor, generally the sensor or sensing element is oriented on the substrate or backing, and the sensor is then fixed to the substrate. This process requires high precision instruments or a trained individual to locate the sensing element in the desired location and orientation. The sensing element is quite difficult to handle due to its brittleness and small size. Accordingly, there is a need for a method of forming a sensor which minimizes or avoids having to handle, locate or attach the sensing element.

SUMMARY OF THE INVENTION

The present invention is a generally flexible strain gage incorporating a relatively thin semiconducting sensing element mounted to a generally flexible substrate. The strain gage of the present invention has a flexible backing, which makes it easier to mount and enables the gage to be conformed to curved surfaces. The strain sensing element is thin enough to be flexible, and is made from a semiconducting material, such as doped single crystal silicon, which provides a high gage factor relative metal foil, or amorphous silicon as in Uchida U.S. Pat. No. ; 4,658,233. In a preferred embodiment, the invention is a generally flexible strain gage comprising a semiconducting single crystal strain sensing element or a semiconducting polycrystalline strain sensing element, and a generally flexible substrate supporting the strain sensing element.

The present invention is also directed to a method for manufacturing a sensor or sensing element mounted on a flexible substrate. In the present method, the sensing element is formed on a wafer, and the flexible substrate is then formed about the sensing element. Once the flexible substrate is cured, the wafer is etched to a precise depth to remove the bulk of the silicon substrate and expose the sensing element. The etch is preferably performed using dry etching techniques, since wet etching can damage sensing elements on the unetched side of the wafer. Furthermore, Reactive Ion Etching (RIE), and preferably Deep Reactive Ion Etching (DRIE) is the dry etch process of choice because it offers high etch rates and high selectivity to etch stop materials.

Because the sensing element is formed directly on the wafer, the sensing element is anchored in the desired location. The substrate can then be formed about the sensing element. In this manner, the sensing element also need not be directly handled or located. In a preferred embodiment, the invention is a method for forming a generally flexible strain gage comprising the step of selecting a wafer having a portion of a base material and portion of a single crystal semiconducting material or polycrystalline semiconducting material located thereon. The method further comprises the steps of etching a strain sensing element out of the semiconducting material and forming a generally flexible substrate onto said sensing element.

Other features and advantages of the present invention will be apparent from the following description, with reference to the accompanying drawings and claims, which form a part of the specification.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENTS

Figure 1:
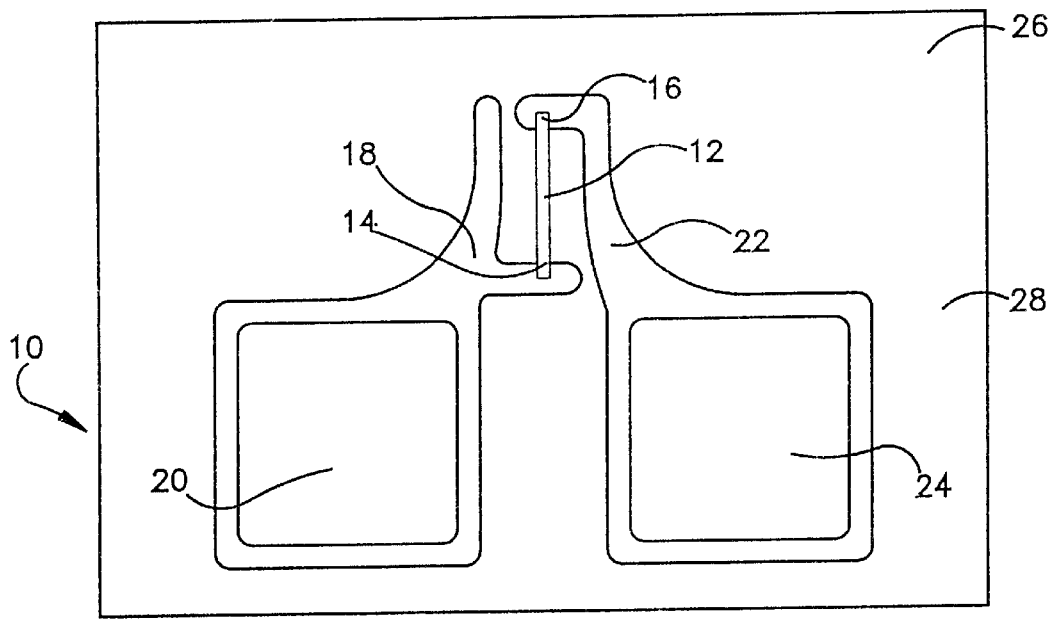
FIG. 1 is a top view of one embodiment of the strain gage of the present invention.

As shown in FIG. 1, the present invention is a strain gage 10 including a strain sensing element 12. The strain sensing element 12 may be any suitable semiconducting material, such as single crystal silicon, doped single crystal silicon, germanium, amorphous silicon, polycrystalline silicon, and the like. However, single crystal semiconducting materials are preferred materials for the sensing element 12. The strain sensing element 12 includes a first end 14 and a second end 16, and the sensing element 12 is preferably thin enough to be generally flexible. The first end 14 is connected to a first electrical lead 18 that couples the first end 14 to the first metal output pad 20. Similarly, the second end 16 is electrically connected to the second output pad 24 by the second lead 22. In a preferred embodiment, each output pad 20, 24 is formed unitarily with its associated lead 18, 22. The output pads 20, 24 and leads 18, 22 may be any electrically conductive material, preferably aluminum, nickel or copper.

Figure 2:
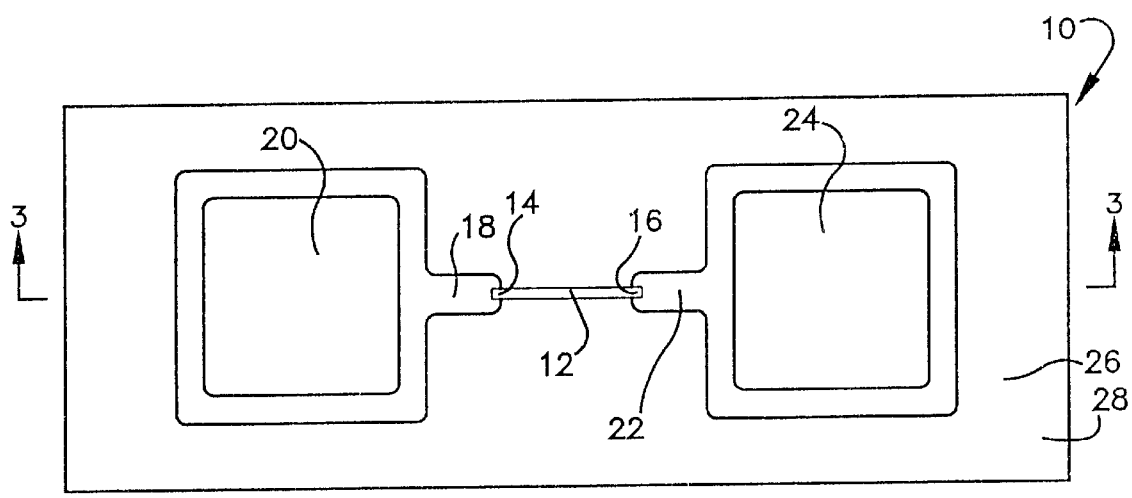
FIG. 2 is a top view of an alternate embodiment of the strain gage of the present invention.
Figure 3:
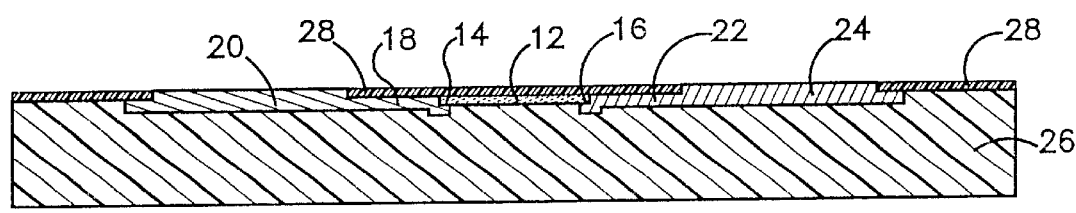
FIG. 3 is a cross sectional side view of the strain gage of FIG. 2.
Figure 4:
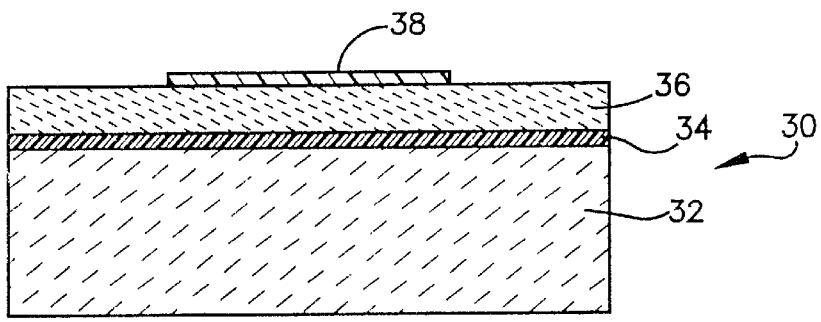
FIGS. 4–12 are cross sectional side views showing the steps of the preferred method for forming the strain gage of FIG. 2.

An alternate embodiment of the strain gage 10 is shown in FIG. 2 and includes generally the same arrangement of the sensing element 12, leads 18, 22, output pads 20, 24, and substrate 26. The output pads 20, 24 are on opposing sides of the sensing element 12. In both FIG. 1 and FIG. 2, the sensing element 12, leads 18, 22 and output pads 20, 24 are carried on a generally flexible substrate 26, such as polyimide. An oxide layer 28 is carried on top of the substrate 26, and is located on top of the sensing element 12, leads 18, 22, and substrate 26. In a preferred embodiment the output pads 20, 24 extend upwardly through the oxide layer 28, and the leads 18, 22 and sensing element 12 are "submerged" below the oxide layer 28. FIG. 3 illustrates the oxide layer 28 that is located on top of the sensing element 12, leads 18, 22 and substrate 26.

A preferred method for forming the strain gage 10 of the present invention is shown in FIGS. 4–12. However, it should be understood that the gage of the present invention may be formed by other, alternate methods. Furthermore, the method described below may be used for manufacturing a wide variety of sensors, and is not limited to the specific type of strain gage sensor described below. For example, the sensors manufactured with the process may include, but are not limited to, heat flux sensors, pressure sensors, accelerometers, temperature sensors, rate sensors, gas sensors, and flow rate sensors.

The process is begun with a wafer 30 which includes a base material 32, oxide layer 34 and doped silicon layer 36 located on top of the oxide 34. The base material 32 is preferably single crystal silicon or polysilicon, and the oxide 34 is preferably silicon dioxide. The base material 32 has a thickness sufficient to lend strength and stiffness to the wafer 30, which facilitates handling the wafer 30. If a flexible sensor is desired, the thickness of the doped silicon layer 36 is less than 20 microns, preferably between about 5 and 20 microns, and further preferably between about 7 and 10 microns. Of course, the thickness can be less than 5 microns if desired, depending on its application. In the described embodiment, the silicon layer 36 will be formed as a strain sensing element, so the silicon layer 36 is doped to the desired sheet resistance, typically ranging from about 10 ohms per square to about 1000 ohms per square and above, depending upon the desired resistance of the gage. These sheet resistances will yield a sensing element having a resistance from about 100 to 10,000 ohms, depending upon the shape and thickness of the sensing element. The silicon layer 36 may be p-type, n-type, or intrinsic.

It should be understood that the doped silicon layer 36 may be replaced with any material from which it is desired to form a sensor. The silicon layer 36 may also be patterned or formed into a sensor other than a strain gage. For example, if a gas sensor is to be formed, the silicon layer 36 is etched to form a comb-finger capacitor. Furthermore, when forming a strain gage, the silicon layer 36 may be replaced with other suitable materials, such as germanium or amorphous silicon, to form a strain gage having a strain sensing element formed from such materials.

Once the wafer 30 is selected, a mask 38 is placed on top of the doped silicon layer 36. The strain sensing element 12 is then formed using standard photolithography and etching which removes the undesired portion of the silicon layer 36, and leaves behind the desired portion of the layer 36 as the strain sensing element 12. (see FIG. 5) If a sensor or sensing element other than a strain gage is to be manufactured, it is formed in place of the strain sensing element 12. This formation of the sensor may involve multiple steps and treatments to the layer 36 beyond those specifically discussed herein. Additionally, multiple layers of materials may be used in place of the single layer 36. The formation of the sensor may also involve the addition of other materials and/or additional dry or wet etching.

Figure 5:
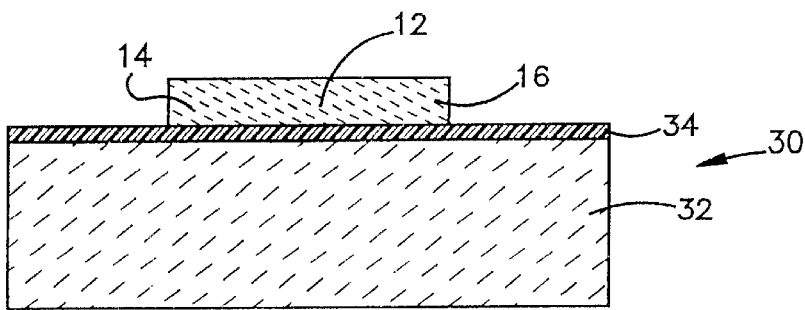
Figure 6:
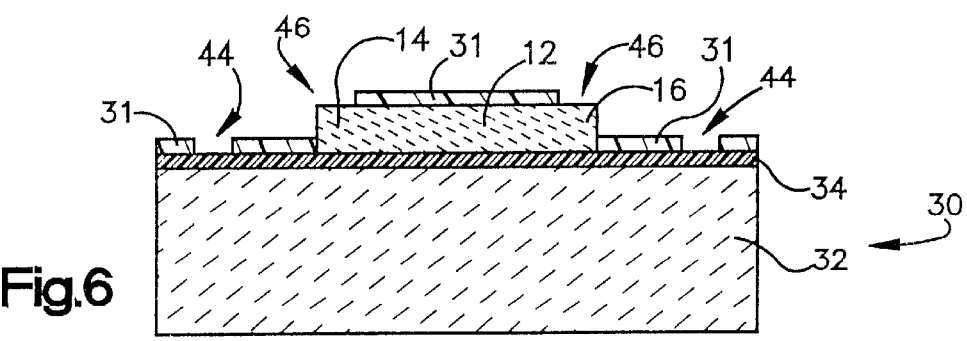
Figure 7:
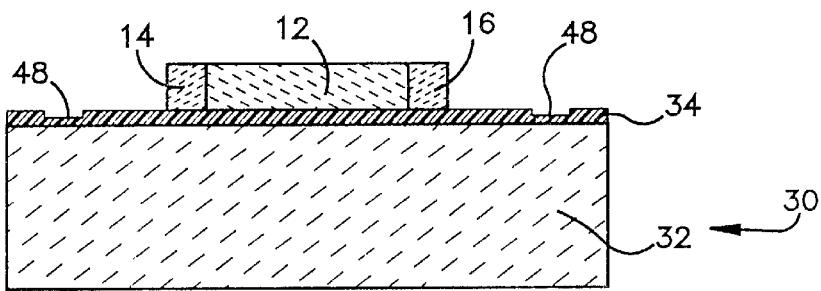

Returning to the illustrated example, FIG. 5 shows the wafer 30 after the strain sensing element 12 has been formed. Next, as shown in FIG. 6, a mask pattern 31 is placed on top of the sensing element 12 and the oxide layer 34. A pair of windows 44 are formed on either side of the strain sensing element 12. The windows 44 are cutouts in the mask pattern 31 that leave portions of the oxide layer 34 exposed. A second pair of windows 46 are located on the first end 14 and second end 16 of the strain sensing element 12, and the windows 46 leave the ends 14, 16 exposed. During the next step, the oxide layer 34 is etched through the windows 44. The oxide layer 34 is etched through a portion of its thickness to form indention 48 (FIG. 7). Next, the first end 14 and second end 16 of the sensing element 12 are exposed to a means of doping, such as diffusion or implant, to further dope the ends 14, 16 of the sensing element 12. The additionally doped areas of the sensing element 12 are illustrated with different shading in the accompanying figures. This additional doping of the strain sensing element 12 may be practiced to improve the conductivity between the sensing element 12 and the leads 18, 22, but is not essential to the invention. The additional doping step may be desired if n-type silicon is being used for the strain sensing element 12.

Figure 8:
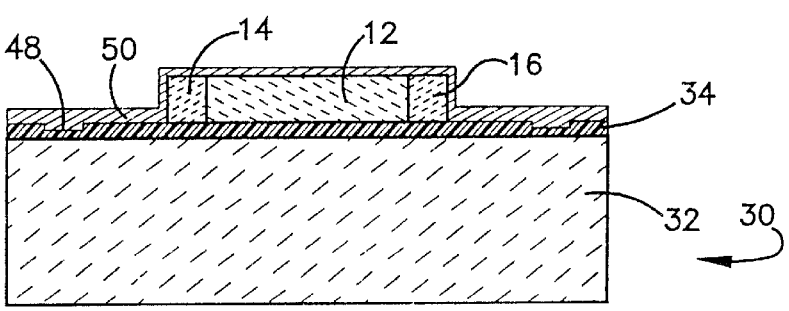
Figure 9:
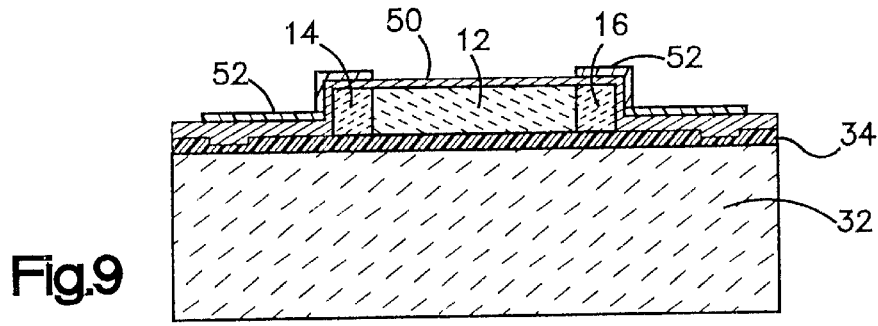

Next, as shown in FIG. 8, a layer of metal 50 is deposited on top of the oxide layer 34 and the sensing element 12, and the metal layer 50 fills in the indentions 48. The metal 50 will eventually form the leads 18, 22 and output pads 20, 24. The metal is preferably aluminum, and is sp uttered onto the wafer 30. However, nearly any desired method of forming the leads and connecting pads may be utilized. As shown in FIG. 9, a mask 52 is subsequently located on top of the metal layer 50 to protect those portions of the metal layer 50 which are not to be removed in the next processing step.

Figure 10:
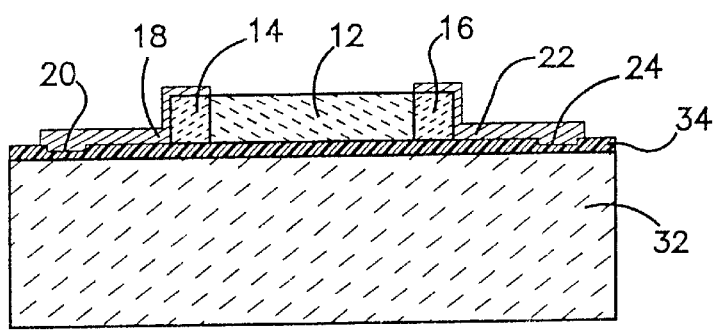
Figure 11:
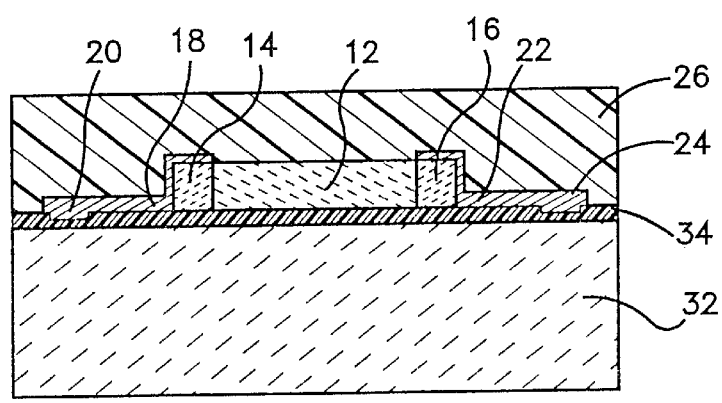
Figure 12:
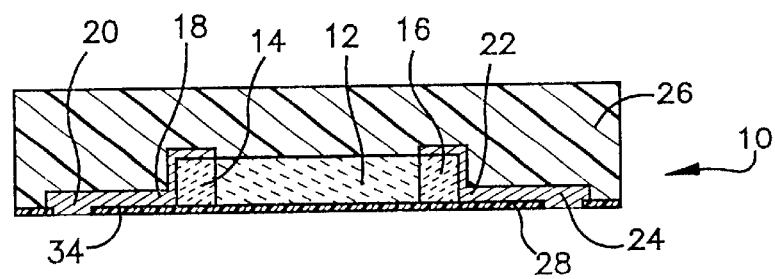
Figure 13:
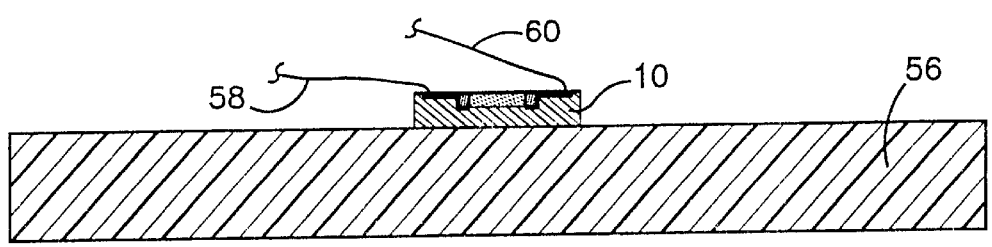
FIG. 13 is a cross sectional side view showing the strain gage of FIG. 12 attached to subject material.

As the next step, the areas of the metal layer 50 that are not covered by the mask 52 are removed by etching, leaving behind the output pads 20, 24 and the leads 18, 22 (FIG. 10). Finally, the generally flexible substrate 26 is spun on the oxide layer 34, pads 20, 24, leads 18, 22 and sensing element 12 (FIG. 11). The flexible substrate 26 is preferably polyimide. Once the polyimide is cured, the base material 32 is removed, and the oxide layer 34 is etched to a sufficient depth until the pads 20, 24 are exposed (FIG. 12). The base material 32 is preferably removed by deep reactive ion etching (DRIE), and the oxide layer 34 is preferably dry etched, exposing the output pads for contacts. Plating can be used to increase metal thickness on the output pads. After it is manufactured, the gage can be mounted to a test specimen 56 with strain gage adhesive, and the output pads 20, 24 provide a surface upon which wires 58, 60 may be bonded or soldered (FIG. 13). The output wires 58, 60 couple the strain gage 10 to an electronic component or components that may calculate the strain measured by the strain gage 10, or further process the output signal. Alternately, the output wires 58, 60 may be connected directly to the ends 14, 16 of the strain sensing element 12, and the leads 18, 22 and output pads 20, 24 may not be formed on the strain gage 10. The output pads merely provide a surface to improve the convenience of electrically connecting the output wires 58, 60 to the ends 14, 16 of the strain sensing element 12.

As can be seen, using the method of the present invention the sensing element 12 is first formed on the wafer 30. After the pads 20, 24 and leads 18, 22 are formed, the substrate 26 is formed about the components of the strain gage 10. Finally, the bulk portion of the wafer 30 is removed, preferably by etching, leaving sensor or strain gage on the substrate 26. In this manner, the strain sensing element 12 need not be handled and/or located on the substrate 26, but the substrate 26 is in stead formed about the strain sensing element 12. This enables easier, faster, and more consistent manufacturing of strain gages.

Although the preferred method of forming the strain gage of the present invention has been described, many other methods may be used to fabricate the flexible sensors of the present invention. For example, a semiconducting strain sensing element m ay be directly placed upon a substrate, in stead of forming a substrate about the strain sensing element. The ends of the strain sensing element may then be connected to a pair of output pads or directly connected to the output wires.

Figure 14:
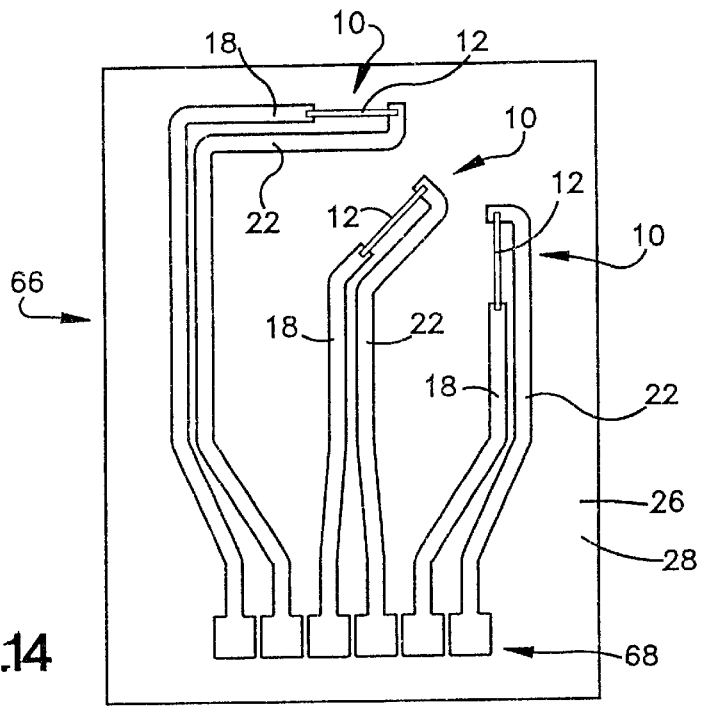
FIG. 14 is a top view of an array of strain gages.
Figure 15:
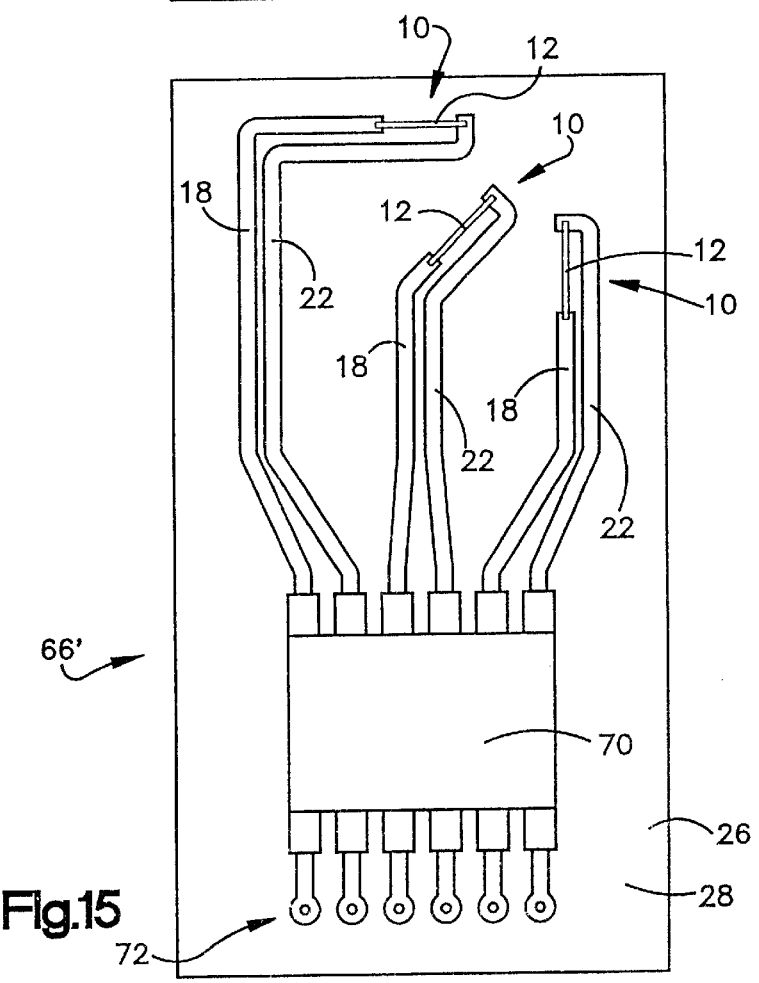
FIG. 15 is a top view of an array of strain gages connected to a processing chip.

The strain gage of the present invention may be formed on a wafer using batch procedures wherein a plurality of strain gages are formed upon a single sheet of flexible material. After manufacturing the gages, each gage may be trimmed from the other surrounding gages for use. Furthermore, a plurality of strain gages may be formed on a wafer or substrate, and some or all of the gages may be electrically connected to an output area or common component. For example, a strain gage array 66 is shown in FIG. 14. The strain gage array 66 illustrated therein includes a plurality of strain gages 10. The leads 18, 22 of each individual strain gage 10 may be patterned to terminate at a single location 68. In this manner, the ends of all of the leads 18, 22 are collected in a common location 68 for ease of connecting to the output wires. In the alternate embodiment of the strain gage array 66' shown in FIG. 15, the leads 18, 22 are commonly routed to an electronic component 70 on the substrate, such as a data acquisition IC. The component 70 may receive the leads 18, 22, and process the signal provided by the leads 18, 22 of each of the individual strain gages 10. For example, the electronic component 70 may provide amplification, bridge completion, interface electronics, A/D conversion, multiplexing, storage and/or telemetry operation. The electronic component 70 has a plurality of terminals 72 for providing data input/output (I/O) or power to the electronic component. By locating the electronic component 70 on the substrate, the array 66' can perform processing steps, thereby making it much more powerful and adaptable than existing strain arrays. Furthermore, because the electronic component 70 is located close to the sensors 10, the sensor output travels a minimal distance before it is processed. This reduces the loss of signal strength and minimizes exposure to interference.

The sensor arrays 66, 66' may be configured such that they are custom manufactured for use upon a known specimen. For example, the flexible substrate may be sized to fit around the specimen's surface, and the strain gages may be manufactured such that they are located in precise, desired locations that correspond to areas of particular interest to be measured on the specimen when the substrate is fitted onto the specimen. In this manner, when the flexible sheet is mounted to the specimen, the strain gages can measure the strain the specimen experiences at its critical points. Again, the leads of the various strain gages, other sensors and/or electronic component(s) may all run to a single location which is convenient for bonding, or to data acquisition, storage, and/or telemetry circuitry located on the flexible sheet.

Figure 16:
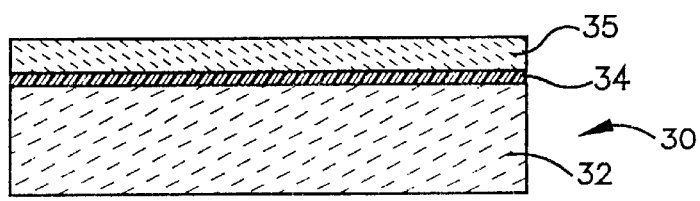
FIGS. 16–27 are cross sectional side views showing the steps of a method for forming an alternate embodiment of the strain gage of the present invention.
Figure 17:
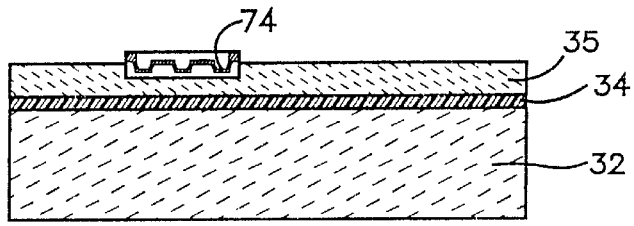

A method for forming a sensor having microelectronic circuitry monolithically integrated thereon is shown in FIGS. 16–27. Although only a single microelectronic component and a single sensor are shown, a plurality of these components and sensors may be incorporated into the finished product. The method described below and shown in FIGS. 16–27 is generally the same as the method described above in conjunction with FIGS. 4–12, with the primary difference being the addition of microelectronic circuitry into the finished product. As shown in FIG. 16, the process begins with a wafer 30 having a silicon layer 35. The wafer 30 includes an oxide layer 34 and base material 32. Next, as shown in FIG. 17, microelectronic circuitry 74 is fabricated into the wafer 30 by conventional methods. Alternately, a wafer 30 having microelectronic circuitry 74 already formed therein may be purchased from a vendor. The microelectronic circuitry 74 is preferably fabricated using any of a variety of technologies, including complimentary metal oxide semiconductor (CMOS), other metal oxide semiconductor technologies such as DMOS, UMOS, VMOS, LDMOS and the like, bipolar processes, hybrid technologies such as BiCMOS, or other technologies. The microelectronic circuitry 74 typically processes, conditions, or otherwise treats the output from the sensor and/or performs other functions required by the end user's system.

Figure 18:
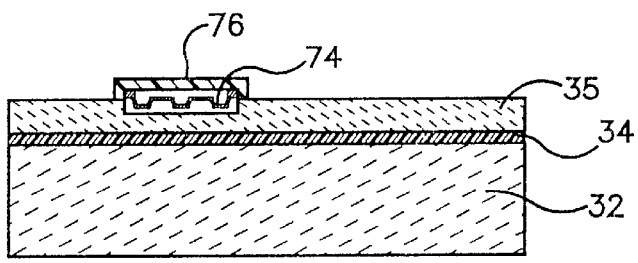
Figure 19:
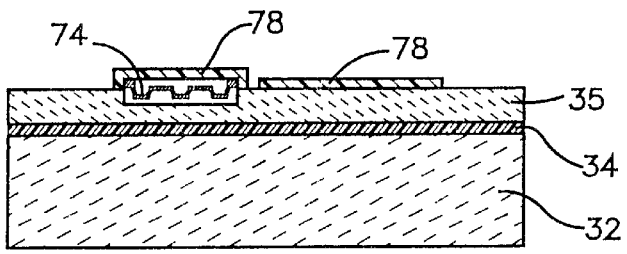
Figure 20:
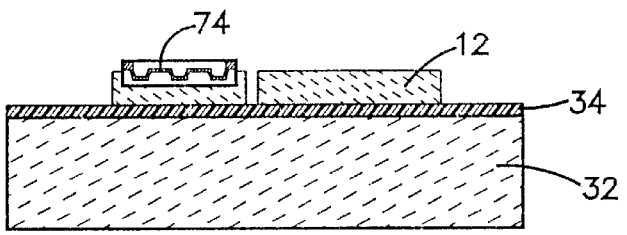
Figure 21:
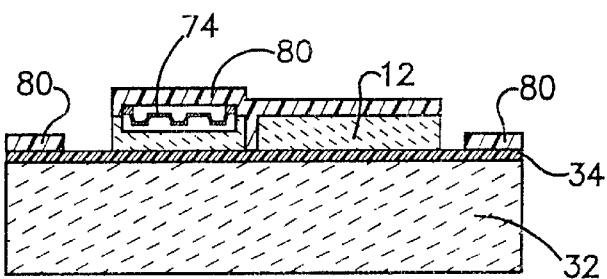
Figure 22:
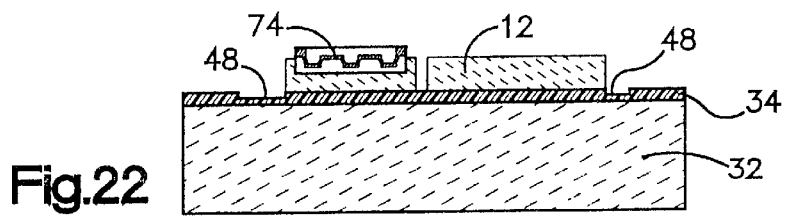
Figure 23:
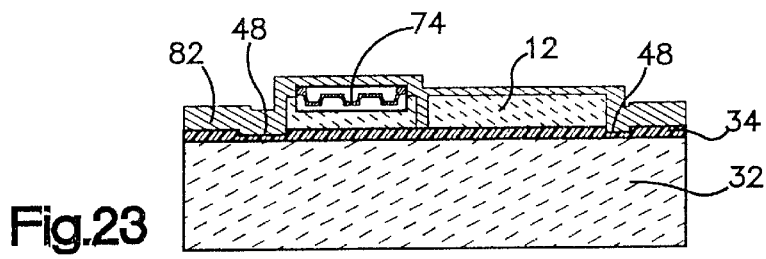

As shown in FIG. 18, the microelectronic circuitry 74 is next protected by a mask 76, and the exposed silicon 35 is doped. Alternately, the step shown in FIG. 18 may be omitted, and the layer 35 may be doped before the circuitry 74 is fabricated in silicon layer 35. Next, a mask 78 is located over the circuitry 74 and part of the layer 35 (FIG. 19). The exposed silicon layer 35 is then selectively removed, leaving behind the sensing element 12 shown in FIG. 20. A mask 80 is then placed over the circuitry 74, sensing element 12 and part of the oxide layer 34 (FIG. 21). The exposed portion of the oxide layer 34 is then etched through part of its thickness to form indentations 48 (FIG. 22).

Figure 24:
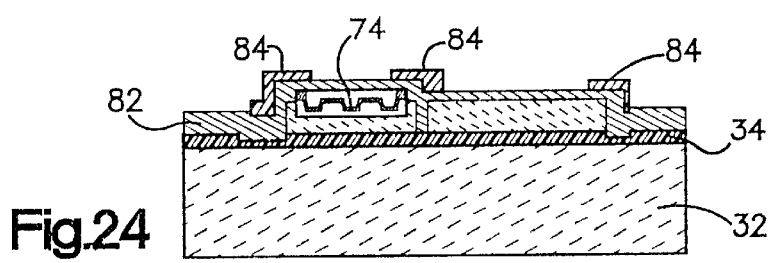
Figure 25:
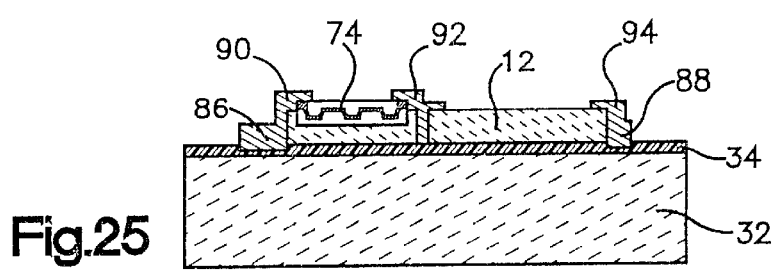
Figure 26:
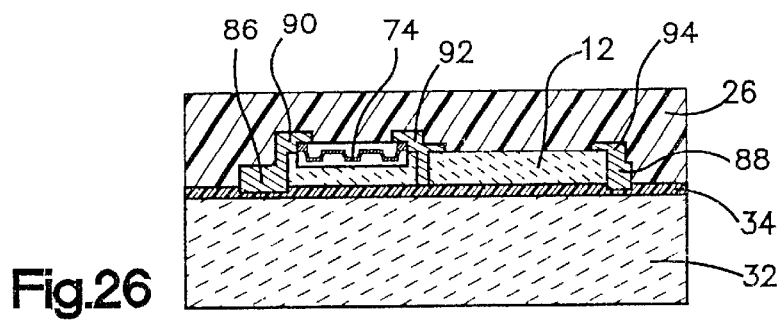
Figure 27:
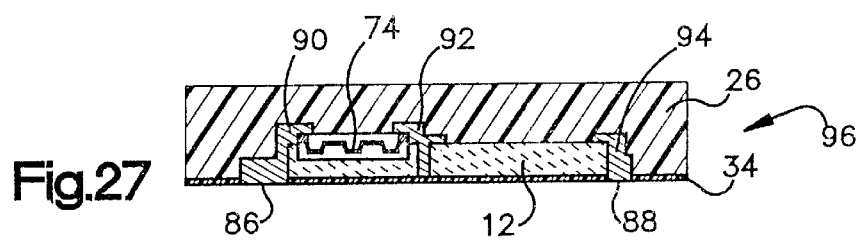

A layer of metal or other conductive material 82 is then deposited over the entire assembly (FIG. 23), and another mask 84 is located over the metal layer 82 (FIG. 24). The exposed portions of the metal layer 82 are removed, leaving behind the pads 86, 88, as well as leads 90, 92, 94 (FIG. 25). Alternately, a "lift-off" technique, as know to those skilled in the art, may be employed to pattern the metal layer 82. Finally, the flexible layer 26 is spun on the entire assembly (FIG. 26) and the base material 32 is removed, resulting in the structure shown in FIG. 27. The resultant assembly 96 is a strain gage and microelectronic circuitry mounted on a flexible substrate. The assembly can be mounted to non-flat components, and the microelectronic circuitry 74 provides processing capability to the assembly 96. Of course, other sensors besides strain gages may be formed using the above-described method.

The preferred form of the invention has been described above. However, with the present disclosure in mind it is believed that obvious alterations to the preferred embodiments, to achieve comparable features and advantages, will become apparent to those of ordinary skill in the art.

What is claimed is:

1. A method for forming a strain sensor on a flexible substrate, the method comprising the steps of:
    providing a wafer having a portion of base material and a portion of sensor material that has at least one property that varies with an applied strain;
    forming said strain sensor out of said sensor material;
    forming said flexible substrate over said strain sensor; and
    removing at least part of said base material to expose at least part of said sensor.

2. The method of claim 1 wherein said flexible substrate is polyimide, and wherein said flexible substrate is spun onto said wafer.

3. The method of claim 1 wherein said sensor is flexible.

4. The method of claim 1 wherein said removing step includes removing said base material using deep reactive ion etching.

5. The method of claim 1 wherein said sensor material is a semiconducting material.

6. The method of claim 1 wherein said sensor material is a single crystal semiconductor.

7. The method of claim 1 wherein the step of forming said sensor comprises etching said sensor material.

8. The method of claim 1 wherein said wafer includes an oxide layer between said base material and said sensor material.

9. The method of claim 1 further comprising the steps of fabricating microelectronic circuitry in said wafer, and electrically connecting said electronic component to said sensor.

10. The method of claim 9 wherein said electrically connecting step includes depositing metal on said wafer such that said deposited metal electrically connects said electronic component and said sensor.

11. The method of claim 1 wherein said substrate is directly deposited over said sensor in a liquid form, and wherein the method further comprises the step of curing said substrate.

12. The method of claim 1 wherein said substrate is formed over said sensor such that said substrate is thick enough to support said sensor.

13. The method of claim 1 wherein said wafer includes an oxide layer located between said portion of base material and said portion of sensor material, and wherein said removing step includes removing at least part of said base material located over said sensor to expose at least part of said oxide layer.

14. A method for forming a flexible strain gage comprising the steps of:
    selecting a wafer having a portion of a base material and portion of a single crystal semiconducting material or polycrystalline semiconducting material located thereon;
    etching a strain sensing element out of said semiconducting material; and
    forming a flexible substrate onto said sensing element;
    etching away said base material after said forming step.

15. The method of claim 14 wherein said strain sensing element is silicon.

16. The method of claim 14 wherein said base material is etched away using deep reactive ion etching.

17. The method of claim 14 wherein said wafer includes an oxide layer between said base material and said semiconducting material, and wherein said etching step includes removing said base material until at least part of said oxide layer located over said sensor is exposed.

18. The method of claim 14 wherein said wafer includes an oxide layer between said base material and said semiconducting material.

19. The method of claim 14 further comprising the step of electrically connecting a first output pad to said sensing element after said etching step.

20. The method of claim 19 further comprising the step of doping a portion of said strain sensing element, and wherein said output pad is connected to said sensing element at said doped portion.

21. The method of claim 19 wherein said output pad is formed by metal sputtering, and wherein said output pad is connected to said sensing element by a metal lead.

22. The method of claim 19 wherein said wafer includes an oxide layer between said base material and said semiconducting material, and wherein the method further comprises the step of partially etching a portion of said oxide layer before forming said output pad, and wherein said output pad is formed in said partially etched portion of said oxide layer.

23. The method of claim 14 further comprising the steps of fabricating microelectronic circuitry in said wafer, and electrically connecting said microelectronic circuitry to said strain sensing element.

24. A method for forming a strain sensor array comprising the steps of:
    providing a wafer having a portion of base material and a portion of sensor material that has at least one property that varies with an applied strain;
    forming a plurality of strain sensors out of said sensor material;
    forming a flexible substrate over said plurality of strain sensors; and
    removing at least part of said base material to expose at least part of each sensor.

25. The method of claim 24 wherein each sensor has an output lead, and wherein said output leads terminate in a common area.

26. The method of claim 24 wherein each sensor has an output lead, and wherein said output leads are connected to an electronic component carried on said substrate.

27. The method of claim 24 further comprising the steps of fabricating microelectronic circuitry in said wafer before forming said sensors, and electrically connecting said circuitry to at least one of said sensors.

28. A method for forming a strain sensor on a flexible substrate, the method comprising the steps of:

selecting a wafer having a portion of base material and a portion of sensor material;

forming said strain sensor by etching said sensor material;

directly depositing said substrate over said sensor in a liquid form;

allowing said substrate to cure such that said substrate is in a solid but flexible form; and removing at least part of said base material to expose said sensor.

29. A method for manufacturing a flexible strain gage comprising the steps of:

providing a wafer having a portion of base material and a portion of sensor material that has at least one property that varies with an applied strain;

etching said sensor material to form a strain gage;

depositing at least one lead on said wafer, said at least one lead being electrically coupled to said strain gage;

depositing a flexible substrate over said substrate and said at least one lead; and removing at least part of the base material located over said sensor and located over said at least one lead to expose said at least one lead.

30. A method for forming a strain sensor on a flexible substrate, the method comprising the steps of:

providing a wafer having a portion of base material and a portion of semiconducting material;

forming said strain sensor out of said portion of semiconducting material;

forming said flexible substrate over said sensor; and removing at least part of said base material to expose at least part of said sensor.

31. The method of claim 30 wherein said semiconducting material is silicon.

* * * * *